United States Patent [19]

Kubota et al.

[11] 3,790,702

[45] Feb. 5, 1974

[54] GAMMA CORRECTION CIRCUIT

[75] Inventors: Yasuharu Kubota; Ryuji Shiono, both of Kanagawa, Japan

[73] Assignee: Sony Corporation, Tokyo, Japan

[22] Filed: Nov. 22, 1972

[21] Appl. No.: 308,654

[30] Foreign Application Priority Data

Nov. 27, 1971 Japan .............................. 46/95640

[52] U.S. Cl. .... 178/5.4 R, 178/5.4 ST, 178/DIG. 16
[51] Int. Cl. ............................................ H04n 9/53
[58] Field of Search ...... 178/5.4 R, 5.4 ST, DIG. 16

[56] References Cited

UNITED STATES PATENTS 3,684,825 8/1972 Dischert et al. ............ 178/DIG. 16

*Primary Examiner*—Robert L. Richardson
*Attorney, Agent, or Firm*—Lewis H. Eslinger, Esq.; A. Sinderbrand, Esq.

[57] ABSTRACT

In a gamma correction circuit for a color television camera, a luminance signal is supplied to one input of a non-linear conducting circuit, preferably including at least one semiconductor diode, so as to vary the conductance of such diode, while a chrominance signal is supplied to another input of the non-linear conducting circuit to provide a gamma corrected chrominance signal as the output therefrom.

16 Claims, 15 Drawing Figures

PATENTED FEB 5 1974

3,790,702

GAMMA CORRECTION CIRCUIT

This invention relates generally to gamma correction circuits for television systems, and more particularly is directed to a circuit for effecting gamma correction of the chrominance signal derived from a single-tube color television camera on the basis of the luminance signal from such camera.

In conventional black-and-white or monochrome television systems, it has been known that the picture tube of the television receiver has a non-linear characteristic between the input signal thereto and its luminosity and that the image pickup tube of the camera also has a non-linear characteristic between the amount of light supplied thereto and its output signal. Accordingly, the signal obtained from the pickup tube is, in general, applied to the picture tube through a non-linear circuit which compensates for the non-linear characteristics of the pickup tube and the picture tube. This non-linear circuit is generally referred to as a gamma correction circuit and acts to reproduce a natural picture on the screen of the picture tube.

For similar reason, a gamma correction circuit is also required in a color television system so as to correct or compensate for its non-linear characteristic. In conventional color television cameras provided with four image pickup tubes for respectively producing color signals corresponding to the three primary colors and a luminance signal, gamma correction circuits are associated with the outputs of the four tubes. In single-tube color television cameras providing an output that contains a chrominance signal, that is, a carrier modulated with the color signals, the gamma correction is applied to the several color signals individually after the latter have been obtained by demodulation of the chrominance signal. Even in the case where the chrominance signal is demodulated to produce color difference signals, the gamma correction is applied to the three primary color signals individually only after such signals have been obtained by passage of the color difference signals through a matrix circuit. It will be apparent that such gamma correction of the three primary color signals indivisually, whether in the case of a four-tube or a single-tube color television camera, results in a relatively complex and costly arrangement. Thus, when it has been desired to take full advantage of the potential low cost and simplicity of single-tube color television cameras, gamma correction circuits have not been provided for the individual primary color signals derived from the output of the tube, and gamma correction has only been applied to the luminance signal. However, when the object being televised is highly luminous, the levels of the color signals are increased relative to the level of the luminance signal with the result that a truly balanced color picture cannot be reproduced.

Accordingly, it is an object of the invention to provide an improved gamma correction circuit which is particularly suited for effecting gamma correction of the chrominance signal in the output of a single-tube color television camera.

Another object is to provide a gamma correction circuit, as aforesaid, in which the chrominance signal is directly gamma corrected on the basis of the luminance signal.

A further object of the invention is to provide a color television camera which is relatively inexpensive and simple in construction and which produces gamma corrected color signals.

A still further object is to provide a color television camera having a composite signal output containing luminance and chrominance signals which are both gamma corrected.

In accordance with an aspect of this invention, the luminance and chrominance signals, for example, contained in the output of the image pickup tube of a single-tube color television camera, are separately applied to a circuit having a non-linear characteristic which is varied according to the luminance signal so as to obtain a directly gamma corrected chrominance signal as the output from such circuit. In preferred embodiments of the invention, the circuit having a non-linear characteristic includes at least one semiconductor diode having its conductance varied in accordance with the luminance signal for applying the gamma correction to the chrominance signal.

The above, and other objects, features and advantages of the invention will be apparent in the following detailed description of illustrative embodiments which is to be read in connection with the accompanying drawings, wherein.

Figure 1:
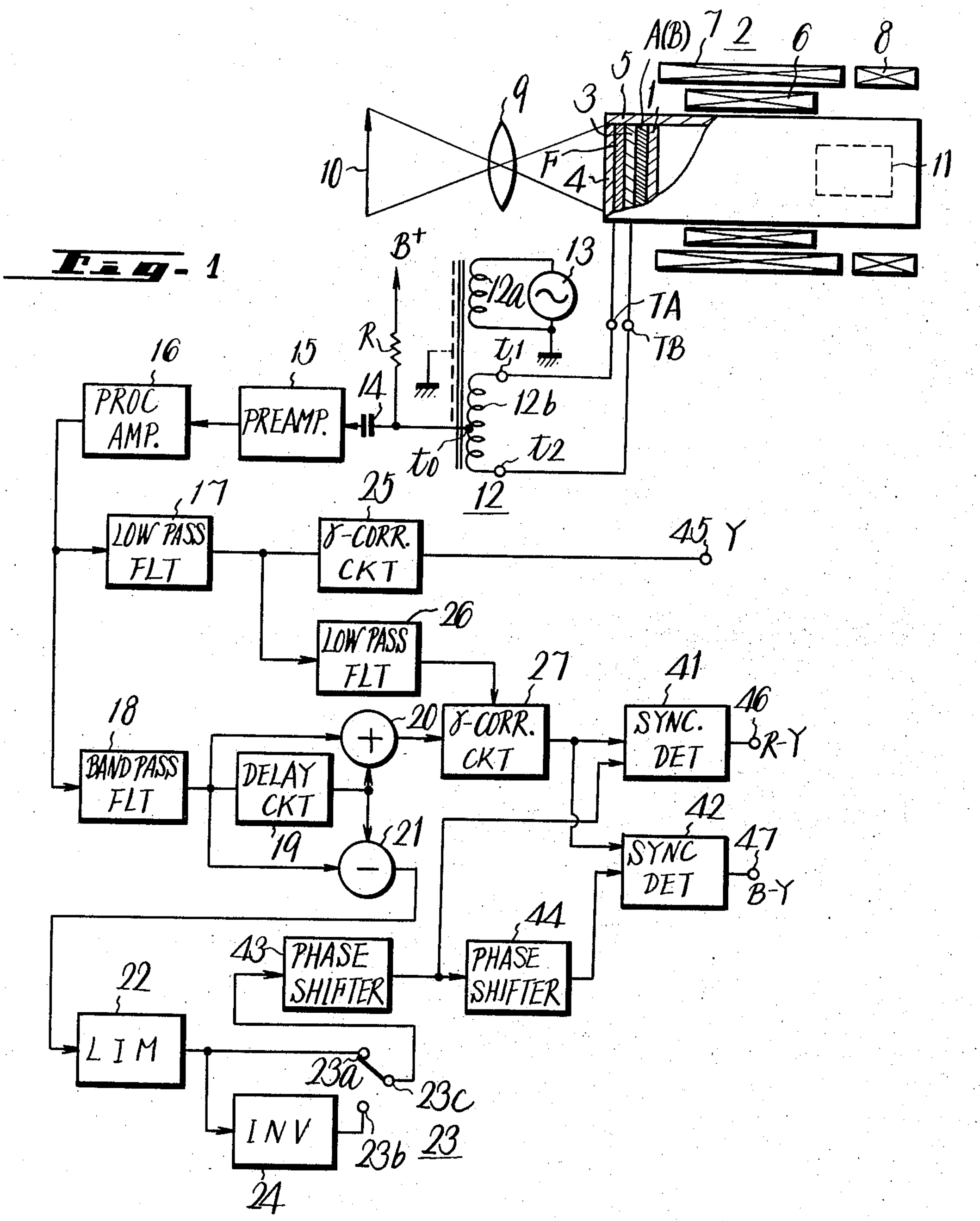
FIG. 1 is a system diagram illustrating a color television camera of a type in which a gamma correction circuit in accordance with the present invention may be employed.
Figures 2, 3:
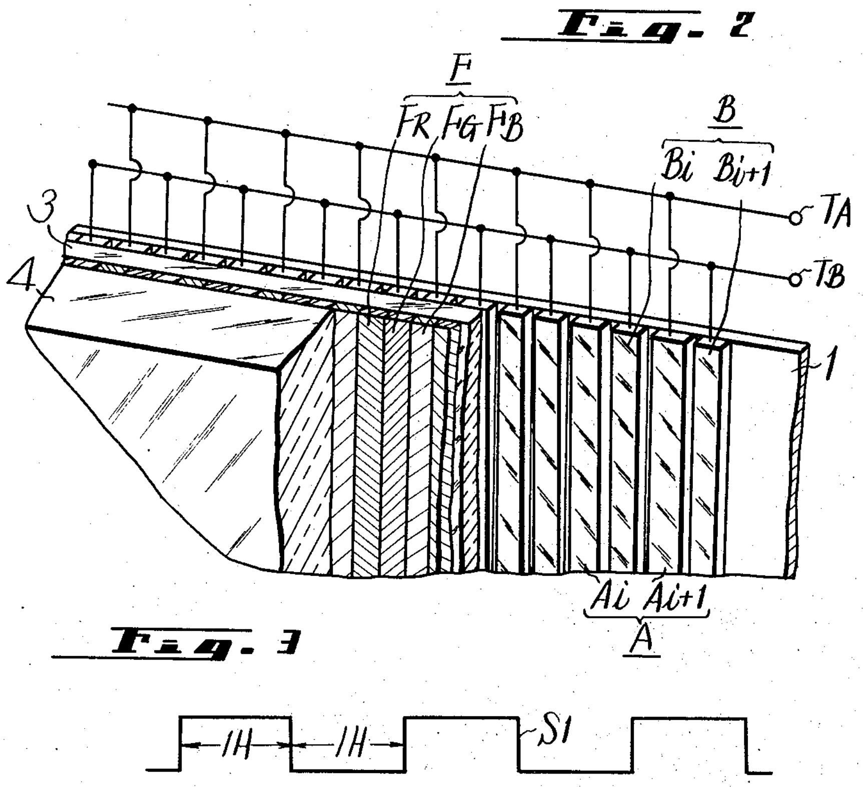
FIG. 2 is a perspective view, partly in cross-section, schematically showing the principal parts of the image pickup tube employed in the color television camera illustrated in FIG. 1.
Figure 5:
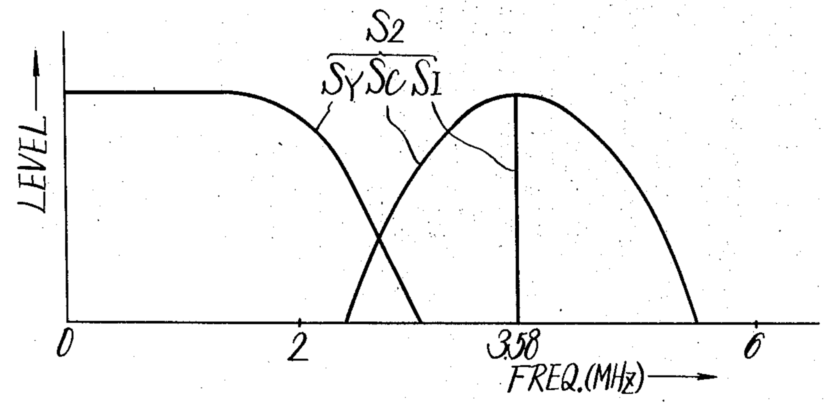
Figure 6:
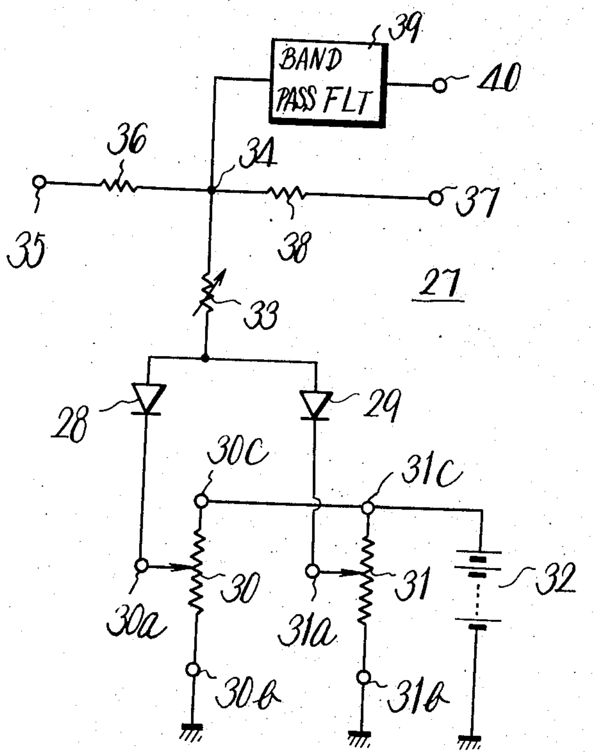
Figure 7:
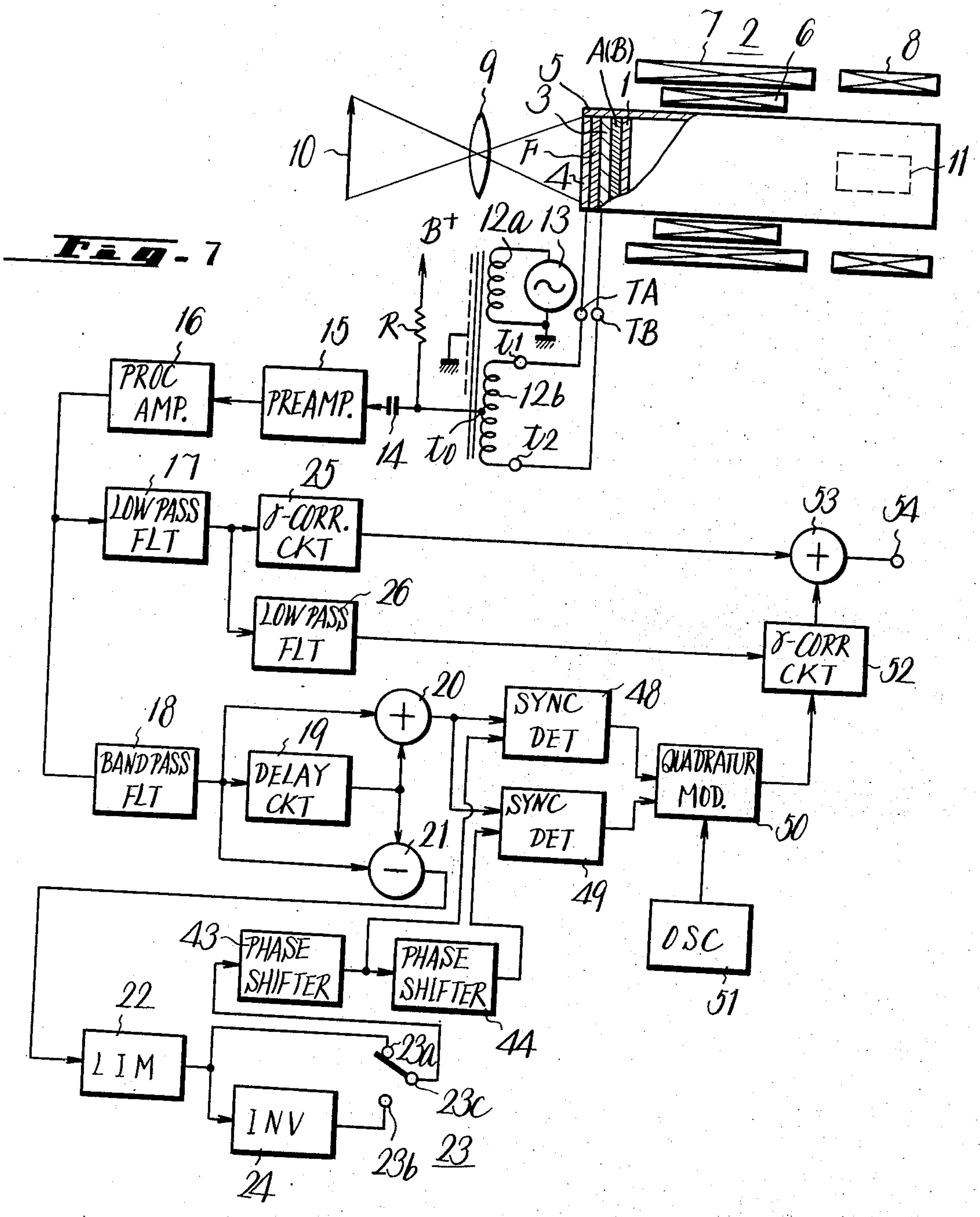

FIGS. 3,4A–4F, and 4A′–4C′ are waveform diagrams, for explaining the operation of the camera shown on FIGS. 1 and 2;

FIG. 5 is a graph showing one example of a frequency spectrum for a color video signal produced by the color television camera of FIGS. 1 and 2;

FIG. 6 is a circuit diagram of one embodiment of a gamma correction circuit according to this invention; and FIG. 7 is a system diagram similar to FIG. 1, but showing a color television camera provided with a gamma correction circuit in accordance with another embodiment of the invention.

Referring to FIGS. 1 and 2 in detail, it will be seen that a color television camera to be provided with a gamma correction circuit according to this invention may be of the type disclosed in U.S. Pat. No. 3,688,020, having a common assignee herewith, and which generally comprises an image pickup tube 2 having a tube envelope 5 closed, at one end, by a face plate assembly that includes a transparent faceplate 4 having a color filter F on its inner surface, a glass plate 3 against the inner side of filter F and having electrodes A and B on the inner surface of plate 3, and photoconductive layer 1 covering at least the electrodes A and B on glass plate 3. An electron gun 11 is provided within tube envelope 5 for emitting an electron beam toward layer 1, and a deflecting coil 6, focusing coil 7 and alignment coil 8 are provided about tube envelope 5 for deflecting the electron beam so that the latter scans layer 1, and for focusing and aligning the electron beam, respectively. The color television camera is further shown to have an image lens 9 effective to focus onto photoconductive layer 1 through faceplate 4 an image of the object 10 in the field of view of the camera.

The index electrodes A (composed of elements $A_1$, $A_2$, . . . $A_i$, . . . $A_n$) and B (composed of elements $B_1$,$B_2$ . . . $B_i$ . . . $B_n$) are disposed adjacent the photoconductive layer 1 which may be formed, for example, of materials such as antimony trisulfide, lead oxide and the like. The electrodes A and B are transparent conductive layers, for example, formed of tin oxide including antimony, and they are arranged with their elements parallel and alternated, for example, in an order which may be $A_1$,$B_1$,$A_2$,$B_2$, . . . $A_i$,$B_i$, . . . $A_n$,$B_n$. The electrodes A and B are shown respectively connected to terminals $T_A$ And $T_B$ for connection with external circuits. In this case, the elctrodes A and B are disposed so that the longitudinal axes of their elongated elements may cross the horizontal scanning direction of the electron beam.

The filter F which is shown separated from electrodes A and B by glass plate 3 is made up of red, green and blue color filter elements $F_R$,$F_G$ and $F_B$ arranged in a repeating cyclic order of $F_R$,$F_G$,$F_B$,$F_R$,$F_G$,$F_B$ . . . and disposed parallel to the length of the elements of electrodes A and B in such a manner that each triad of red, green and blue color filter elements $F_R$,$F_G$ and $F_B$ may be opposite and corresponds to a pair of adjacent electrode elements $A_i$ and $B_i$. So long as the elements of electrodes A and B and of optical filter F are aligned with each other in the longitudinal direction, that is, extend parallel to each other, and each triad of filter elements $F_R$, $F_G$ and $F_B$ has a pitch, that is extends over a lateral distance, that is equal to the pitch or lateral distance of the respective pair of electrode elements $A_i$ and $B_i$, the relative lateral positioning of the color filter elements and the electrode elements is not critical.

The image pickup tube 2 is associated with circuits which are shown schematically on FIG. 1 to include a transformer 12 provided with a primary winding **12*a* and a secondary winding 12*b* with a mid tap $t_0$. The end terminals $t_1$ and $t_2$ of secondary winding 12*b* are respectively connected to terminals $T_A$ and $T_B$ of the image pickup tube 2. The primary winding 12*a* is connected to a signal source 13 which produces an alternating signal $S_I$ (FIG. 3) that is synchronized with the line scanning period of the image pickup tube 2. This alternating signal $S_I$ has a rectangular waveform with a pulse width equal to a horizontal scanning period H of the electron beam, for example, a pulse width of 63.5 microseconds, and a frequency which is one-half of the horizontal scanning frequency, namely, 15.75/2 KHz. The mid tap $t_0$ of secondary winding 12*b* is connected to the input of a preamplifier 15 through a capacitor 14** and is supplied with a DC bias voltage of 10 to 50V from a power source B+ through a resistor R.

With such an arrangement, the electrodes A and B are alternately supplied with voltages higher and lower than the DC bias voltage for every horizontal scanning period, so that a striped potential pattern corresponding to the electrodes A and B is formed on the surface of the photoconductive layer 1. Accordingly, when the image pickup tube 2 is not exposed to light, electron beam scanning of layer 1 results in a signal $S_I$ corresponding to the rectangular waveform illustrated in FIG. 4A being derived, in a scanning period $H_1$, at the mid tap $t_0$of the secondary winding **12*b*. When a DC bias voltage, for example, 30V, is supplied to the mid tap $t_0$ of the secondary winding 12*b*** and an alternating voltage of 0.5V is impressed between the terminals $T_A$ and $T_B$, the current flowing across the resistor R varies by 0.05 microamperes and can be used as an index signal. The frequency of this index signal $S_I$ is determined by the width and interval of the elements of electrodes A and B, that is, by the pitch of lateral distance covered by each pair of electrode elements $A_i$ and $B_i$, and by the horizontal scanning frequency of the electron beam which may be selected to provide the index signal $S_I$ with a frequency of, for example, 3.58 MHz.

Figure 4A:
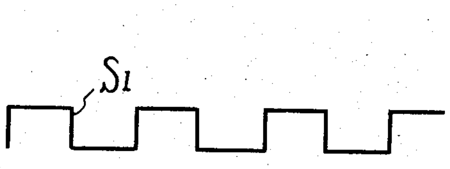
Figure 4B:
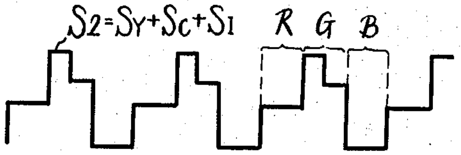
Figure 4C:
Figure 4A:
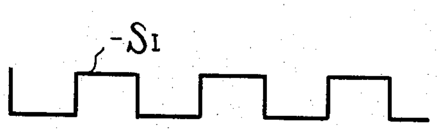
Figure 4B:
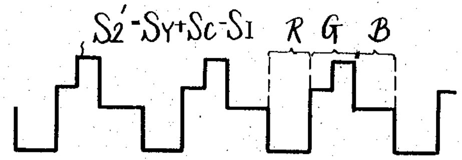
Figure 4C:
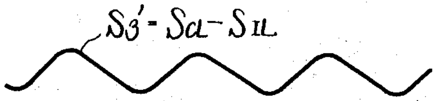

When a color separated image of the object 10 is focused on the photoconductive layer 1 by means of lens 9 and filter F, signals corresponding to the light intensity of the filtered red, green and blue components are produced in over-lapping relation with the index signal $S_I$ in response to beam scanning of layer 1 to produce a composite signal $S_2$ such as is illustrated in FIG. 4B, and in which the reference characters R,G and B respectively designate portions of the composite signal $S_2$ corresponding to the red, green and blue color components. The composite signal $S_2$, which is supplied to the input of preamplifier 15, is the sum of the luminance signal $S_Y$, the chrominance signal $S_C$ and the index signal $S_I$, namely $S_2=S_Y+S_C+S_I$. The frequency spectrum of the composite signal $S_2$, as illustrated in FIG. 5, is determined by the width of the elements of electrodes A and B and of the optical filter F, and by the horizontal scanning period. That is, the composite signal $S_2$ , in its entirety, is in a bandwidth of 6MHz and the luminance and chrominance signals $S_Y$ and $S_C$ are respectively arranged in the lower and higher bands of that bandwidth. It is preferred to minimize overlapping of the luminance and chrominance signals $S_Y$ and $S_C$ and, if desired, it is possible to dispose a lenticular lens or the like in front of the image pickup tube 2. This optically lowers resolution and narrows the luminance signal band.

In the next horizontal scanning period $H_{i+1}$ the voltages (the alternating signal) applied to the electrodes A and B are reversed, in which case an index signal $-S_I$ is produced, as depicted in FIG. 4A′, which is opposite in phase to the index signal $S_I$ shown in FIG. 4A. Accordingly, a composite signal $S_2'$ is then supplied to the input side of preamplifier 15, as shown in FIG. 4B′, namely $S_2'=S_Y+S_C-S_I$.

Such a composite signal $S_2$ (or $S_2'$) is supplied through the preamplifier 15 to the process amplifier 16 for waveform shaping. Thereafter, the signal is applied to a low-pass filter 17 and a bandpass filter 18. As a result, the luminance signal $S_Y$ and a signal $S_3=S_{CL}+S_{IL}$ (FIG. 4C), or a signal $S_3'=S_{CL}-S_{IL}$ (FIG. 4C′) are respectively derived from the low-pass filter 17 and the band-pass filter 18. In the foregoing equations for $S_3$ and $S_3'$, $S_{CL}$ and $S_{IL}$ are low frequency or fundamental components of the chrominance signal $S_L$ and the index signal $S_I$, respectively. If desired, the low-pass filter 17 may be replaced by a conventional carrier trap circuit diesigned so that its center frequency is the carrier frequency of the chrominance signal $S_C$.

Since the pitch of each pair of electrode elements $A_i$ and $B_i$ of index electrodes A and B is equal to the pitch of each triad of filter elements $F_R$,$F_G$ and $F_B$, the repetitive frequencies of the index signal $S_I$ and the chrominance signal $S_C$ are equal to each other, and the separation of those signals $S_I$ and $S_C$ may be achieved in the following manner without using a filter.

Figure 4D:
Figure 4E:

Reference numeral 19 indicates a delay circuit, for example, an ultrasonic delay line, by means of which the signal $S_3 = S_{CL} + S_{IL}$ (or $S_3' = S_{CL} - S_{IL}$) derived from the bandpass filter 18 is delayed one horizontal scanning period 1H. The signal $S_3 = S_{CL} + S_{IL}$ (or $S_3' = S_{CL} - S_{IL}$) in a certain horizontal scanning period $H_i$ and the signal $S_3' = S_{CL} - S_{IL}$ (or $S_3 = S_{CL} \pm S_{IL}$) in the subsequent horizontal scanning period $H_{i+1}$, which are derived from the delay circuit 19 and the bandpass filter 18, are supplied to an adder circuit 20 to be added together, providing as an output a chrominance signal $2S_{CL}$ such as is depicted in FIG. 4D. In this case, the contents of chrominance signals in adjacent horizontal scanning periods the same. Further, it is also possible to delay the signal from the bandpass filter 18 by three or five horizontal scanning periods due to their similarity.

Figure 4F:

These signals $S_3 = S_{CL} + S_{IL}$ (or $S_3' + S_{CL} - S_{IL}$) and $S_3' = S_{CL} - S_{IL}$ (or $S_3 = S_{CL} \pm S_{IL}$) in the horizontal scanning periods $H_i$ and $H_{i+1}$ are also applied to a subtraction circuit 21 to achieve a subtraction $(S_{CL} - S_{IL}) - (S_{CL} + S_{IL})$ [or $(S_{CL} + S_{IL}) - (S_{CL} - S_{IL})$] and to derive therefrom an index signal $-2S'_{IL}$, or $2S'_{IL}$, is fed to a limiter circuit 22 to render its amplitude uniform, and thereby forming an index signal $-2S_I$ (or $2S_I$) as depicted in FIG. 4F.

The index signal $-2S_I$ (or $2S_I$) thus obtained is reversed in phase at every horizontal scanning period, so that the signal $-2S_I$ is corrected in phase through the use of a change-over switch 23 (an electronic switch in practice) having fixed contacts 23*a* and 23*b* and a movable contact 23*c*. The output side of the limiter 22 is directly connected to one fixed contact 23*a* of the change-over switch 23 and to the other fixed contact 23*b* through an inverter 24. The change-over switch 23 is constructed so that its movable contact 23*c* makes contact with the fixed contacts 23*a* and 23*b* alternately for every horizontal scanning period in synchronism with the alternating signal $S_I$ impressed on the primary winding 12*a* of the transformer 12 to thereby derive the index signal $2S_I$ from the movable contact 23*c* at all times.

In the embodiment of the invention illustrated by FIG. 1, the luminance signal $S_Y$ derived from the low-pass filter 17 is supplied to a gamma correction circuit 25 which is of conventional construction, for example, in the form of a gamma correction amplifier, for applying the desired gamma correction to the luminance signal alone. Further, the luminance signal $S_Y$ from low-pass filter 17 is passed through a low-pass filter 26 to provide a luminance signal $S'_Y$ of a band-width that is limited to avoid overlapping with the band of chrominance signal $2S_{CL}$. The luminance signal $S'_Y$ from filter 26 and the chrominance signal $2S_{CL}$ derived from adder circuit 20 are supplied to respective input terminals of a gamma correction circuit 27 which, in accordance with this invention, comprises a non-linear conducting circuit for the chrominance signal having its conductivity varied in response to the luminance signal so that the output from the circuit 27 will be a gamma corrected chrominance signal.

As shown particularly on FIG. 6, in a practical embodiment of the gamma correction circuit 27 according to the invention, the non-linear conducting circuit may be generally comprised of a pair of semiconductor diodes 28 and 29 having their cathodes connected to the movable contacts 30*a* and 31*a* of variable resistors 30 and 31, respectively. The ends 30*b* and 31*b* of resistors 30 and 31 are connected to ground, and their other ends 30*c* and 31*c* are connected in parallel to the positive terminal of a D.C. voltage source, for example, a battery 32, which has its negative terminal connected to ground, and by which a bias is applied to the diodes 28 and 29. The anodes of diodes 28 and 29 are connected together to a variable resistor 33 which is, in turn, connected to a connection point or junction 34 connected with an input terminal 35, by way of a resistor 36, and with an input terminal 37, by way of a resistor 38. The input terminals 35 and 37 respectively receive the luminance signal $S'_Y$ from filter 26 and the chrominance signal $2S_{CL}$ from adder circuit 20, and the connection point 34 is also connected to an output terminal 40 through a band-pass filter 39 which has the center of its pass band substantially equal to the carrier frequency of the chrominance signal $2S_{CL}$.

With the above described circuit arrangement of circuit 27, the level of the luminance signal $S'_Y$ supplied to input terminal 35 is selected to be much higher than the level of the chrominance signal $2S_{CL}$ supplied to the other input terminal 37, and further the resistor 36 is given a comparatively high resistance value particularly in respect to the impedance of diodes 28 and 29, so that the luminance signal $S'_Y$ acts as a source of a current from the connection point 34 through diodes 28 and 29, which current is substantially constant irrespective of the conductance of the diodes, that is, substantially only dependent on the luminance signal $S'_Y$. Accordingly, the operating point of the diodes 28 and 29 on their volt-ampere characteristic curve, and hence the conductance of the diodes, is determined by the luminance signal $S'_Y$. Since the diodes 28 and 29 and the resistor 38 act as a voltage divider for the chrominance signal $2S_{CL}$ supplied to the input terminal 37, the chrominance signal supplied to output terminal 40 through band-pass filter 39 is controlled in accordance with the division ratio of the variable conductance of diodes 28 and 29 and the resistance value of resistor 38.

The theoretical basis for the gamma correction of the chrominance signal according to this invention is as follows:

Assuming that the luminance signal fed to input terminal 35 is $E_Y$, the chrominance signal fed to input terminal 37 is $e_c$ and the voltage generated at the connection point 34 is $E_{out}$, then the following relationships exist.

$$E_{in} \equiv E_Y + e_c$$
$$E_{out} = E_{in}\gamma = (E_Y + e_c)\gamma$$
$$= E_Y\gamma\ [(1 + (e_c/E_Y)]\ \gamma$$
$$= E_Y\gamma\ \{1 + (\gamma/1!)(e_c/E_Y) + [\gamma(\gamma - 1)/2!\ ]\ (e_c)^2E_Y + \ldots\}$$

If $\gamma$ is smaller than $1 (\gamma < 1)$ and $E_Y$ is much larger than $e_c$ ($E_Y >> e_c$), $E_{out}$ can be expressed as follows:

$E_{out} \div E_Y\gamma + \gamma(E_Y\gamma/E_Y)ec$ That is to say, the voltage $E_{out}$ expressed by the above equation is produced at the connection point 34. When the voltage $E_{out}$ is fed to the band-pass filter 39 having the carrier of the chrominance signal as its center frequency, this filter 39 delivers to the output terminal 40 the voltage $\gamma(E_Y\gamma/E_Y)e_c$. In other words, the chrominance signal $2S_{CL}$ fed to input terminal 37 is subjected to gamma correction the gamma correction circuit 27, with the luminance signal $S'_Y$ (determining such correction, and then is delivered to output terminal 40. In the illustrated embodiment, the value of the factor $\gamma$ is determined in accordance with the adjustment of the variable resistors 30,31 and 33 and the characteristic of the diodes 28 and 29.

Referring again to FIG. 1, it will be seen that the gamma corrected chrominance signal derived from gamma correction circuit 27 is applied to synchronous detectors 41 and 42. The synchronous detector 41 is also supplied with the index signal $S_{IL}$ derived from the movable contact 23*c* of change-over switch 23 through a phase shifter 43 which adjusts the phase of the index signal to that of the red signal so as to produce a color-difference signal R-Y at the output of detector 41. Similarly, the other detector 42 is also supplied with the output signal from the phase shifter 43 through a second phase shifter 44 so as to produce a color-difference signal B-Y at the output of detector 42. Thus, with the camera shown in FIG. 1, a gamma corrected luminance signal Y is obtained at an output terminal 45 from the gamma correction circuit 25, and the gamma corrected color-difference signals R-Y and B-Y from the synchronous detectors 41 and 42 are obtained at output terminals 46 and 47, respectively.

Since the color signals thus obtained are gamma-corrected, as mentioned above, a color picture reproduced on the basis of such color signals has excellent balance and high fidelity. Further, the signals obtained at output terminals 45,46 and 47 may be suitably processed to produce color television signals for use with the NTSC system and other various systems.

Another embodiment of the present invention will now be described with reference to FIG. 7, in which elements or components corresponding to those appearing in FIG. 1, and which are substantially the same in construction and operation, are identified by the same reference numerals. In the embodiment shown in FIG. 7, the chrominance signal $2S_{CL}$ derived from adder circuit 20 is directly applied to synchronous detectors 48 and 49. The index signal derived from the movable contact 23*c* of change-over switch 23 is also fed to detectors 48 and 49 through the phase shifter 43 and the phase shifters 43 and 44, respectively, so that color-difference signals R-Y and B-Y are derived from detectors 48 and 49, respectively. Such color difference signals R-Y and B-Y are applied to a quadrature modulator 50 which is also supplied with the 3.58 MHz frequency output of an oscillator 51, as a sub-carrier for color signal, and the modulator 50 produces the chrominance signal $I_S$ for the NTSC system at its output. The chrominance signal $I_S$ derived from the modulator 50 is fed to one of the input terminals of a gamma correction circuit 52 which may be similar to the circuit 27 described above with reference to FIG. 6. The luminance signal $S'_Y$ obrained from the low-pass filter 26 is applied to the other input terminal of gamma correction circuit 52 which thus provides a gamma corrected chrominance signal at its output terminal in the same manner as described above. The thus obtained gamma corrected chrominance signal and the gamma corrected luminance signal from gamma correction circuit 25 are both applied to an adder circuit 53 which then delivers a composite color signal for the NTSC system to an output terminal 54.

Although the invention has been described above as being applied to a color television camera having a single image pickup tube and an associated color filter, it will be apparent that gamma correction in accordance with the invention can have other applications, for example, can be effected in connection with a color television camera having a plurality of image pickup tubes, or in connection with the reproduction of a color picture from an image which is suitably recorded on a monochrome film so as to contain the necessary luminance and chrominance information.

Further, although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. A gamma correction circuit comprising a source of luminance signal, a source of chrominance signal, a non-linear conducting circuit including at least one conducting device of variable conductance, means connecting said source of luminance signal with said non-linear conducting circuit for varying said conductance of the conducting device in accordance with said luminance signal, means connecting said source of chrominance signal with said non-linear conducting circuit, and output means for obtaining from said non-linear conducting circuit a chrominance signl which is gamma corrected in accordance with said varying of the conductance of said conducting device.

2. A gamma correction circuit according to claim 1; in which said output means includes band-pass filter means having its pass band substantially centered at the carrier frequency of said chrominance signal so as to filter said luminance signal from the gamma-corrected chrominance signal.

3. A gamma correction circuit according to claim 1; in which said sources of luminance and chrominance signals are connected through respective resistors to an intermediate connecting point which is, in turn, connected to said conducting device.

4. A gamma correction circuit according to claim 3; in which the level of said luminance signal from said source thereof is much larger than the level of said chrominance signal from said source of the latter.

5. A gamma correction circuit according to claim 3; in which said output means is also connected to said connecting point.

6. A gamma correction circuit according to claim 5; in which said one conducting device is a semiconductor diode connected between said connecting point and ground.

7. A gamma correction circuit according to claim 6; in which said non-linear conducting circuit further includes another semiconductor diode connected between said connecting point and ground in parallel with said one diode.

8. A gamma correction circuit according to claim 6; further comprising means for applying a variable bias to said diode.

9. A gamma correction circuit according to claim 1; in which said one conducting device is a semiconductor diode.

10. A gamma correction circuit according to claim 9; in which non-linear conducting circuit further includes another semiconductor diode connected in parallel with said one diode.

11. A color television camera comprising image pickup means for producing a luminance signal and a chrominance signal respectively corresponding to the luminance and chrominance of an object in the field of view of the camera, a non-linear conducting circuit including at least one conducting device of variable conductance, means for applying said luminance signal to said non-linear conducting circuit so as to vary said conductance of the conducting device in accordance with said luminance signal, means for applying said chrominance signal to said non-linear conducting circuit, and output means for obtaining from said non-linear conducting circuit a chrominance signal which is gamma corrected in response to variations of the conductance of said conducting device.

12. A color television camera according to claim 11; in which said image pickup means includes a color separating filter by which said chrominance signal is made to consist of successive primary color signals modulating a predetermined carrier.

13. A color television camera according to claim 12; in which said output means includes band-pass filter means having a pass band centered at the frequency of said carrier for filtering said luminance signal from said gamma corrected chrominance signal.

14. A color television camera according to claim 11; further comprising means for demodulating said chrominance signal from the image pickup means so as to obtain a plurality of demodulated color signals, means for modulating a predetermined carrier with said color signals so as to provide a second chrominance signal which is applied to said non-linear conducting circuit.

15. A color television camera according to claim 14; further comprising means for effecting gamma correction of said luminance signal, and adder circuit means for adding together said gamma corrected chrominance signal and said gamma corrected luminance signal to produce a corresponding composite signal.

16. A color television camera according to claim 11; further comprising means for effecting gamma correction of said luminance signal.

* * * * *